United States Patent [19]

Bertholet et al.

[11] Patent Number: 5,714,094
[45] Date of Patent: Feb. 3, 1998

[54] ANTIOXIDANT COMPOSITION AND PROCESS FOR THE PREPARATION THEREOF

[75] Inventors: Raymond Bertholet, Blonay; Ladislas Colarow, Savigny; Andrej Kusy, Froideville; Vincent Rivier, Cheseaux, all of Switzerland

[73] Assignee: Nestec S.A., Vevey, Switzerland

[21] Appl. No.: 500,780

[22] Filed: Jul. 11, 1995

[30] Foreign Application Priority Data

Jul. 23, 1994 [EP] European Pat. Off. .............. 94111537

[51] Int. Cl.$^6$ .................... C09K 15/22; A23F 5/00; A23D 9/00; A23L 1/00
[52] U.S. Cl. .................... 252/403; 252/403; 252/404; 252/405; 252/407; 426/312; 426/417; 426/432; 426/433; 426/434; 426/541; 426/542; 426/654
[58] Field of Search .................... 426/417, 433, 426/432, 434, 312, 541, 542, 654; 252/403, 404, 405, 407

[56] References Cited

U.S. PATENT DOCUMENTS

| 2,198,207 | 10/1940 | Musher | 99/152 |
|---|---|---|---|
| 2,314,988 | 1/1943 | Redmond et al. | 99/163 |
| 3,354,188 | 11/1967 | Bock et al. | 260/424 |
| 3,477,856 | 11/1969 | Schultz | 99/105 |
| 3,663,581 | 5/1972 | Lehmann et al. | 260/398.5 |
| 3,704,132 | 11/1972 | Strobel | 99/65 |
| 3,770,456 | 11/1973 | Roselius et al. | 426/354 |
| 4,156,031 | 5/1979 | Hammell et al. | 426/541 |
| 4,168,324 | 9/1979 | Roselius et al. | 426/312 |
| 4,255,458 | 3/1981 | Roselius et al. | 426/424 |
| 4,323,514 | 4/1982 | Dieffenbacher | 260/412.3 |
| 5,372,831 | 12/1994 | Koch et al. | 426/388 |

FOREIGN PATENT DOCUMENTS

| 0714968 | 5/1996 | European Pat. Off. . |
|---|---|---|
| 2426259 | 4/1975 | Germany . |
| 24 26 259 | 12/1975 | Germany . |
| 16 68 236 | 10/1979 | Germany . |
| 84-111140 | 9/1982 | Japan . |
| 91-113523 | 1/1988 | Japan . |
| 91-203795 | 10/1989 | Japan . |

OTHER PUBLICATIONS

German Patent Application Abstract DE 2426259, Dec. 4, 1975.

*Primary Examiner*—Sharon Gibson
*Assistant Examiner*—Deanna Baxam
*Attorney, Agent, or Firm*—Young & Thompson

[57] ABSTRACT

An antioxidant composition and a process of recovering the same from a gelatinous retentate of spent ground coffee oil, comprising from 20 to 60% wt of complex lipids and from 10 to 75% wt of carboxylic acids 5-hydroxytryptamides, in which the 5-HT are for example those of behenic, arachidic and/or lignoceric acids, and the complex lipids are phospholipids and glycolipids. This composition may be advantageously used in food products.

12 Claims, No Drawings

ANTIOXIDANT COMPOSITION AND PROCESS FOR THE PREPARATION THEREOF

BACKGROUND OF THE INVENTION

1. Field of the Invention

The present invention relates to an antioxidant composition of natural origin, to a process for the preparation thereof and to the use of said composition especially in food products and for aroma stabilization.

2. Description of the Related Art

It is known that coffee beans contain natural antioxidants, which are represented mainly by 5-hydroxytryptamides (5-HT) of long-chain fatty acids such as arachidic, behenic and lignoceric acids, along with certain phenol acids and tetraoxygenated phenylindans. The hydroxytryptamides are seldom isolated in a pure form for reasons associated with their photoreactivity and chemical instability. Furthermore, they are only slightly soluble in foodgrade fats or oils and therefore their antioxidant activity remains relatively low for pratical applications.

Various methods have already been described for isolating antioxidant, such as especially 5-HT, from coffee wax or coffee pellicles (DE 2,426,259), as well as from green coffee beans (DE 1,668,236) and from roasted coffee beans (JP 3,127,973).

However, all these methods are not usable on an industrial scale either because the starting products are too expensive for the aimed purpose or because they involve chemical agents which are difficult to remove from the final product or which disavantageously affect the antioxidant activity thereof.

SUMMARY OF THE INVENTION

Consequently, the purpose of the present invention is to provide a stable composition of natural and unexpensive origin having an effective antioxidant activity usable especially in food products, as well as a process for the preparation thereof.

After various attempts, the present inventors have found that spent ground (SG) coffee oil constitutes a very interesting and unexpensive raw material to obtain the aimed composition, which has an unexpectedly high antioxidant activity and which is quite well appropriate for use in food products as antioxidant agent.

As a matter of fact, spent coffee grounds represent a waste material which results basically from the production of instant coffee. Roasted coffee beans ground to a specific particle size are extracted in a counter-current mode with water at elevated pressures and temperatures in the range of 150°–180° C. The aqueous extract is used to produce the instant coffee, whereas the residual SG solids contain 15–25 weight percent of both neutral and polar lipids as well as subpercent levels of antioxidant materials, such as 5-HT species, polymeric Maillard reaction products and ppm levels of some hydroxylated cinnamic acid derivatives and phenylindans.

The lipids along with the antioxidant materials can be obtained by pressing the SG solids at defined known conditions. The technique produces a crude oily suspension which can be separated into its aqueous and crude oil phases by centrifugation. The antioxidant materials and polar lipids form lipophilic micellar units which accumulate in the oil phase. Consequently, the micellar units may also carry additional antioxidant compounds from the spent grounds, which dissolve poorly in vegetable oils alone.

Alternatively, the SG solids can be dehydrated and extracted using an organic solvent such as hexane or methylene chloride. A typical composition of SG coffee oils is presented in the following Table I.

TABLE I

Typical composition of a spent ground coffee oil

| Lipid Classes | Weight Percent |
|---|---|
| Triacylglycerols (TAG) | 65–90 |
| Diacylglycerols (DAG) | 1–5 |
| Monoacylglycerols (MAG) | <1 |
| Free Fatty Acids (FFA) | 1–5 |
| Sterols | <3 |
| Cafestol and Kahweol Esters | 10–18 |
| Cafestolene and Kahweolene Esters | 1–3 |
| Polar Micellar Constituents (including complex lipids and 5-HT) | 1–10 |

The object of the invention is thus an antioxidant composition comprising from 20 to 60% wt of complex lipids and from 10 to 75% wt of carboxylic acids 5-hydroxytryptamides from spent ground coffee oil. The complex lipids are herein defined as for example phospholipids and glycolipids, and the 5-HT are preferably those of behenic, arachidic and/or lignoceric acids.

Furthermore, the antioxidant composition may also contain up about 20% wt of diterpene esters, more particularly from 0 to 15%, up to about 15% wt of diacylglycerols, more particularly from 2 to 8%, and up to about 60% wt of triacylglycerols, more particularly from 10 to 35%.

As a particular embodiment of the invention, the composition advantageously contains 30 to 55% of complex lipids and 15 to 35% of 5-HT.

The antioxidant composition according to the invention is conveniently usable as such in the foodstuffs industry, as well as for aroma protection and stabilization.

A second object of the present invention consists in a process for the preparation of the above antioxidant composition, which comprises the steps of recovering a gelatinous retentate from a spent ground coffee oil, deoiling the said retentate and extracting it so as to obtain the aimed composition in solid form.

The first separating step can be carried out by filtration, for example by means of various methods which are known per se, such as Büchner apparatus (laboratory) or through filtration cartridges or metallic sieves (industrial), optionally with the use of a filter aid (Celite$^R$ or Dicalite$^R$ for example). After filtration, the retentate can be extracted, for example, by solvent extraction or by supercritical $CO_2$ extraction.

DETAILED DESCRIPTION OF THE PREFERRED EMBODIMENTS

The SG oils are typically dark-brown in color, since the mucilaginous materials or gums form a gelatinous phase which precipitates only partially on prolonged storage. The gelatinous phase is composed mainly of complex lipids which hydrate in the presence of residual water, entrapping other constituents present in the SG oil. Thus, the phase represents a matrix composed of hydrated complex lipids, mono-, di- and triacylglycerols, sterols, unesterified fatty acids (FFA), terpenes (cafestol and kahweol esters) and antioxidants.

More particularly, and as already mentioned, recovery of the gelatinous phase involves first the use of a filtration technology. The simplest approach consists in passing the SG oil at 20°–25° C. through a laboratory Büchner filter which communicates with a vacuum source (50–300 mB). The filter retains the gelatinous phase (15–35%) which becomes plastic, whereas the cleaned oil (65–85%) is collected as the filtrate.

A major improvement in the filtration rate is achieved by means of filtration cartriges of the type "PALL MCS 1001" (fluted surface 1200 cm$^2$) and "MBS 1001" (flat surface 450 cm$^2$), the porosity of which is in the range of 5–35 µm. The oil is filtered at 18°–25° C. under vacuum in the range of 100–300 mb, preferably 100 mb, after which the gelatinous phase is scraped off mechanically from the outer filter surface. The procedures are partly described in EP 0.561, 009.

Alternatively, "Celite 235" can be dispersed in the oil before filtration. The filter aid (20–60 g, preferably 40 g/1000 g oil) prevents filter clogging and accelerates the filtration rate. Thus the gelatinous phase and Celite form a solid residue which is removed mechanically from the outer surface of the filter. The residue contains 55–75% coffee oil, 5–15% polar or hexane insoluble materials and 10–30% Celite.

Another preferred filtration procedure involves the use of "Dicalite" as the filter aid, whereas the filtration cartrige is operated at pressures in the range of 3–6 bars, preferably 4 bars. The oil containing 3–6% filter aid is brought to 80° C., cooled to 15–30, preferably 20° C., and then passed through a filtration cartrige "PALL PSS MBS 1001" fitted with a flat metallic sieve, the porosity of which is 5–35 µm. A typical filtration cycle proceeds at 4 bars and lasts 1–3 hours, after which the filter cake is scraped off from the outer filter wall and the cartrige regenerated by means of injected steam. The procedure yields 15–25% filter retentate which contains residual coffee oil (55–75%), hexane insoluble materials (5–15%) and the filter aid.

Regarding the further extracting step, the filter residues (1000 g) retained by the Büchner or metallic sieve types of filters can be suspended in 2–4 volumes of hexane and centrifuged for one min at 2000 G. The hexane phase is discarded, the pellet resuspended in the same solvent and centrifuged as above. Then, the deoiled pellet is desolvantized at 70° C. under vacuum, thus producing 75 g dark-brown powder, which exhibits a strong antioxidant activity. The product presents a flat organoleptic profile and its taste is only slightly wooden.

As a further alternative, the filter retentate (50–150 g) can be loaded in a laboratory scale Supercritical $CO_2$ extractor, which is then operated according to known proceeding (see for example A. Simon, "Extraktion" in Food Technologies Magazin, November 1992) at different conditions, in order to establish the parameters for the most selective deoiling of the antioxidant materials; these parameters have been found to be the following: temperature=50° C.; pressure=250 bars; $CO_2$ flow rate=9 lt/hr; time=8 hrs.

The SG antioxidant material (12.5 µm/5 µl chloroform-methanol 2:1) were analyzed by planar chromatography using 10×20 cm high-performance silica gel plates Merck and chloroform-acetone 9:1 (v/v) as the elution solvent. The samples were spotted as 5×1 mm bands by means of Linomat IV (Camag AG). After elution, the plate was immersed in a $CuSO_4/H_3PO_4$ reagent, charred for 9 min at 180° C. and then scanned using the Desaga CD-60 Densitometer. The amounts of all lipid classes were expressed semiquantitatively as areas percent values as shown in Table II.

TABLE II

| LIPID CLASSES | Antioxidant Materials Deoiled By | | | |
|---|---|---|---|---|
| | Solvent | | SC $CO_2$ | |
| Relative Area % Values | Range | Typical Values | Range | Typical Values |
| Complex Lipids | 30–40 | 35 | 40–55 | 49 |
| 5-HT Species | 25–35 | 23 | 15–30 | 22 |
| Diterpene Esters | 10–14 | 12 | 1–5 | 2 |
| Diacylglycerols | 4–8 | 6 | 0–2 | 1 |
| Triacylglycerols | 20–30 | 24 | 15–35 | 26 |

The most interesting antioxidant materials according to the present invention are represented by those having elevated ratios of complex lipids and 5-HT species to the remaining lipid classes.

Antioxidant activity of the above materials was measured and compared to that of other known antioxidants, using the Rancimat type of apparatus (for example "Rancimat 679" of Metrohm SA, Herisau, Switzerland), which was operated at 110° C. The apparatus detects the onset of oxidation in fats and oils or the induction period, which is accelerated at increased temperatures. Thus, defined amounts of the antioxidant materials and fresh chicken fat were dissolved in chloroform-methanol 2:1 (v/v) and concentrated to dryness under vacuum. About 4-g aliquots were taken for evaluation by the Rancimat method which measures the induction period in hours for all samples against antioxidant-free chicken fat. The results are presented in Table III.

TABLE III

| RANCIMAT TEST AT 110° C. | |
|---|---|
| Sample | Induction Period in Hours |
| Fresh Chicken Fat | |
| without Antioxidants [A] | 2.5 |
| 1000 ppm Antioxidants[a] From SG Coffee Oil + [A] | 16.2 |
| 1000 ppm Antioxidants[b] From SG Coffee Oil + [A] | 23.3 |
| 500 ppm Ascorbyl Palmitate + [A] | 9.03 |
| 500 ppm Rosemary Extract + [A] | 11.1 |
| 500 ppm 2-3-terc-Butyl-4-methoxyphenol (BHA) + [A] | 15.9 |
| 500 ppm 2,6-di-terc-Butyl-4-methylphenol (BHT) + [A] | 16.7 |
| 200 ppm pure 5-HT-Species + [A] | 5.7 |

[a]method involving solvent extraction
[b]method involving supercritical $CO_2$

The above results demonstrate that supercritical $CO_2$ removes neutral lipide more selectively than apolar organic solvents, whereby the antioxidant activity of the deoiled materials is increased.

It is also important to note from Table III that 200 ppm of pure 5-HT species are three to four times less active than 1000 ppm of the antioxidant materials according to the invention, in which the level of 5-HT species is in average about 20%. This demonstrates that there is an unexpected antioxidant synergy between the 5-HT species and other lipid classes. Moreover, coffee oils contain measurable amounts of other antioxidants such as phenol acids and tetraoxygenated phenylindans, which also appear to potentiate the antioxidant effect. In summary, the antioxidant materials represent a matrix of organic compounds which combine with each other, whereby the resulting antioxidant effect is strongly increased.

As already mentioned, the antioxidant composition according to the present invention can also be used for aroma protection or stabilization, more particularly in a lipidic or non lipidic matrix at concentrations in a range from 0.1 to 20%, preferably from 0.1 to 5%, or better of about 2%.

The lipidic matrix can be an oil, for example a coffee oil, a vegetal oil such as soja or sunflower oil, or an animal oil, a fat or a wax, for example a natural wax such as beeswax, or a sythetic wax such as paraffin.

When the oil is aromatized, then the antioxidant composition is mixed therewith. On the other hand, the aroma can be added to the lipidic matrix containing the antioxidant composition. The incorporation of this composition into a lipidic matrix can be made at various temperatures (25°–100° C.) and through different methods, such as fusion, dissolution or micronisation.

As a non lipidic matrix, it could possibly be envisaged to incorporate the antioxidant composition into the packaging material of food products.

It has been demonstrated for example that an aromatized oil containing about 2% of the antioxidant composition according to the invention absorbs about 20% less oxygen than the same oil not containing the composition, this after a stocking period of one week. A gas chromatography analysis also showed that the methanethiol concentration was 15% higher than that obtained without the use of the antioxidant composition. Thus, it results from the above experiments that even at a concentration of the composition of only 2%, a better protection of the volatil compounds of the aroma included in a lipidic matrix can be achieved.

The present invention will now be further illustrated by additional non limitative Examples of preparation and of application of the antioxidant composition according to the present invention.

EXAMPLE 1

Antioxidants are recovered from the filter aid "Dicalite" described previously in two stages, involving deoiling and extraction. Apolar aliphatic hydrocarbons such as hexane or, preferably heptane, are used for the deoiling step. The residue (1000 g) is suspended in 3–5 volumes of heptane, agitated for 30 min at 20°–25° C. and passed rapidly through a "Seitz filter T2600" at a maximum pressure of 1 bar. The filter cake is washed with one volume of heptane and the filtrate containing coffee oil is added to that collected previously. About 723 g coffee oil is recovered in the filtrates after their desolvantization.

To extract the antioxidant materials, the filter cake is agitated in one volume of heptane for 60 min at 80° C. and filtered using the same facility as above, except that the filtration temperature is kept at 80° C. (the increased temperature is required to melt and dissolve the antioxidant materials absorbed on the filter aid). The filtrate is concentrated to dryness thus leaving 57.5 g dark-brown powder which exhibits the same antioxidant activity as already described. About 220 g Dicalite are recovered after desolvantization of the filter cake.

The method is attractive since it involves only one organic solvent which can be recycled and reused for the deoiling and extraction operations. However, the antioxidant materials can be also recovered from the filter aid using other organic solvents or their mixtures such as chloroform, methanol and isopropanol. Although the solvents are equally efficient, their use remains unattractive in terms of toxicity and increased costs.

EXAMPLE 2

SG coffee oil was mixed with Dicalite (2–5, preferably 4 weight %) and filtered as described previously. The resulting filter cakes containing typically 55–75% residual oil, 10–30% Dicalite and 5–15% antioxidant materials, were deoiled by supercritical $CO_2$ according to the procedure described above. Then, the antioxidant materials were extracted from the deoiled residues using 3 volumes of chloroform-methanol 2:1 preferably, heptane at 80° C. also as described previously.

Alternatively, after supercritical $CO_2$ deoiling, the antioxidant materials (25–35%) are not extracted from the filter cake. Thus, the solvent free filter cake contains 55–75% Dicalite and it can be used as an exogenous flavor carrier and flavor releasing agent. For instance, natural flavors recovered from roasted coffee condensates can be mixed with a small amount of coffee oil and combined with the finely powdered filter cake. Also, the flavored powder can be sealed in a paper sheet and fixed in the lid to close a jar of instant coffee. The antioxidants materials which are in solid state guarantee a slow release of the flavor, which is at the same time protected against decay. The flavor remains fresh and, unlike its powdered source, in a continuous contact with the instant coffee. Also, the deoiled filter cake can be used as a carrier for exogenous artificial flavor preparations which cannot be incorporated and consumed in food products for various reasons.

EXAMPLE 3

Crude vegetable oils are suspended in apolar aliphatic hydrocarbons such as hexane or heptane, which dissolve only the neutral lipid classes (e.g. acylglycerols with molecular weight about 800), whereas complex lipids aggregate to form reverse micelles with mol.wt about 20,000. Polar head groups of the complex lipids are located inside of the micellar units, whereas their fatty acid moieties protrude into the organic solvent. Moreover, the micelles are entrapping all other constituents which are insoluble in the apolar solvents. Such constituents are generally represented by free carbohydrates, proteinaceous and certain unsaponifiable compounds as well as antioxidants with hydrophilic moieties.

The micellar units are separable from the neutral lipid classes by ultrafiltration using commercially availiable solvent resistent membranes with a mol.wt cut-off higher than 8,000. Both polyimide (organic) and mineral membranes such as Carbosep$^R$ and Kerasep™ can be used.

Crude SG coffee oil (3–5 volume) is suspended in hexane (2–4 volume) and the sample is ultrafiltered at 25°–40° C. and pressures in the range of 2–10 bars. Translucid neutral lipids are collected in the hexane permeate whereas the micellar units with entrapped antioxidants are retained by the membrane. The total volume of the circulating suspension is kept constant by a continuous supply of hexane from a separate stock until the permeate is clear and exempt of hexane-soluble lipids. Then the retained materials including antioxidants are eluted from the membrane using polar organic solvents such as chloroform-methanol 2:1 or 1:1 (v/v). Evaporation of the solvent leaves a dark-brown solid residue which exhibits antioxidant activity.

EXAMPLE 4

A stock of crude SG coffee oil obtained by pressing is brought to 80° C. for 3 hours in a stainless-steel tank, cooled to 20° C. and maintained for at least 5 hours under gentle stirring at the same temperature. The oil is allowed to flow by gravity to a filter cartridge "PALL PSS$^R$ MBS 1001" fitted with a metallic sieve of preferably 9 μm and with a surface of 900 cm$^2$. The oil contacts the outer filter wall whereas the inner filter cavity is connected to a vacuum source of 100 mb. After two hours, the filtration process is discontinued and the gelatinous retentate removed from the outer filter surface. The filter is regenerated by injecting steam for 15 min after which the filtration process is continued in 2–3 hour cycles as above (preferably 7 cycles). The procedure yields about 16.8% of retentate.

Alternatively, the filtration procedure can be carried out using "Celite 235", as already described in EP 0 561 009.

Ten kg filter retentate prepared according to the procedure described above are suspended in 30 liters of heptane at 20°–22° C. and homogenized by stirring. The homogenate is separated into its heptane soluble and insoluble phases using a spin-drum centrifuge. The heptane soluble phase is concentrated to dryness thus leaving 8.90 kg coffee oil. The insoluble phase desolvantized under vacuum at 50° C. yields 0.95 kg antioxidant materials which melt at 60°–65° C. Their antioxidant activity was evaluated using the Rancimat type of apparatus as previously described.

EXAMPLE 5

The SG coffee oil (96 kg) is brought to 80° C. in a stanless-steel tank and cooled to 20° C. as in Example 4. Dicalite (4 kg) is dispersed in the oil by stirring until a homogenous suspension is obtained. The tank is closed and its pressure increased to 4 bars using an external source of compressed nitrogen. Thus the oil is filtered in 2-hour cycles under a pressure of 4 bars, using a filter cartrige the porosity of which is 35 μm. The filter is regenerated and the filter cake removed as already described in Example 4. The procedure yields about 20 kg filter retentate.

EXAMPLE 6

The filter retentate as in Example 4 was deoiled by means of supercritical $CO_2$ using a laboratory scale apparatus operating preferably at the following conditions:

| Sample Weight: | 100 g |
| Extraction Pressure: | 250 bars |
| Temperature | 50° C. |
| $CO_2$ Flow-Rate | 9 liters/hour |
| Extraction Time: | 5 hours |

The procedure removes selectively 91–92% coffee oil from the filter retentate whereas the resulting antioxidant material are by ca 40% more active than those described in Example 4.

EXAMPLE 7

One kg of the filter retentate described in Example 5 is dispersed in 5 liters of heptane by mechanical stirring for 60 min at 20°–22° C. and passed through a Seitz filter operating under a 1 bar-pressure. The filter cake is washed with 3 lt heptane and the filtrate concentrated to dryness thus leaving 723 g coffee oil. Then, the deoiled filter cake (640 g) is dispersed in 3 liters of heptane, stirred for 60 min at 80° C. and filtered as above at the same temperature. The latter filtration is repeated with two additional liters of heptane. The filtrates are concentrated under vacuum to a complete dryness thus leaving 57.5 g antioxidant materials which melt at 60°–65° C. About 220 g Dicalite are recovered after desolvantization of the filter residue.

EXAMPLE 8

About 150 g filter retentate (Example 5) are deoiled using a laboratory supercritical $CO_2$ extractor operating at the following conditions:

| Extraction Pressure: | 250 bars |
| Extraction Temperature: | 50° C. |
| Separation: | 50° C. and 50 bars |
| $CO_2$ Flow-Rate: | 18 liters/hour |
| Total Extraction Time: | 7 hours |

The procedure yielded 105 g coffee oil. The deoiled residue was dispersed in heptane and processed at 80° C. as already described in Example 7, thus producing 33 g Dicalite and 11 g antioxidant materials.

EXAMPLE 9

Aromatized coffee oil was prepared as described in EP 0 561 009. Three grams of the oil were weighed into a 50 ml Erlenmayer flask, followed by 300 mg antioxidant materials (Example 4) and then closed with a convenient glass stopper. A second Erlenmayer flask contained only the aromatized oil. The closed flasks were exposed for 2 min to 70° C. to melt and dissolve the antioxidant materials in the former sample, after which the samples were stored for four weeks at room temperature. Each flask was subjected to a sensory evaluation i.e., opened once a day for 5 sec and sniffed. After four weeks, the sample containing the antioxidant materials retained a major part of the natural coffee flavor in comparison to the standard which developed an off-flavor.

Head space profiles of the aromatized samples were compared by gas-chromatography. The analysis provides essentially data on the intensity of the retained flavor. The latter is expressed as the sum of integration units of all peaks resulting from the detection of volatile compounds which elute from the chromatographic column. Thus the head-space of the sample enriched with the antioxidant materials produced $14.1 \times 10^6$ integration units as compared to $7.9 \times 10^6$ units for the standard.

EXAMPLE 10

2 g of the antioxidant composition of Example 1 is incorporated into 100 ml of oil by micronisation by means of an homogenizator at a temperature of 90° C. during 30 mn.

Once the antioxidant composition dissolved in the oil, the mixture is cooled to room temperature (about 25° C.).

The thus treated oil is aromatized, for example according to the method described in EP Patent 0,561,006, and then stored in closed flasks. Closed flasks with aromatized oil not containing the antioxidant composition were also prepared for comparison purposes.

The headspace of the various flasks have then been analyzed by oxygen measurement and by gas chromatography.

The results of the oxygen analyses showed that the aromatized oil containing 2% of antioxidant composition had absorbed 20% less oxygen than the same oil not containing said antioxidant composition, this after a stocking period of one week.

On the other hand, the gas chromatography analysis has demonstrated that the methanethiol concentration of the headspace was of 15% higher in the flasks with the aromatized oil containing the antioxidant composition than in those with the oil which did not contain said composition.

EXAMPLE 11

A regular kitchen fryer was filled up with 2.5 liters commercial peanut oil and the oil temperature brought to 180° C. A series of frozen French fries (150 g) were fried in the oil for 3 min in 30 min cycles. The same procedure was repeated separately with peanut oil containing three different types of antioxidants as documented in Table IV.

Aliquots (5 g) of the frying oils were taken at regular intervals to determine their induction period using the Rancimat type of apparatus which was operated at 120° C. The results are presented in Table IV.

TABLE IV

Induction Period in Hours for Peanut Oil with and without added antioxidants

| Frying Time (hrs) at 180° C. | Pure Peanut Oil | A | B | C |
| --- | --- | --- | --- | --- |
| 0.0 | 2.6 | 8.3 | 9.1 | 5.6 |
| 0.5 | 2.3 | 7.7 | 7.8 | 5.2 |
| 1.5 | 2.1 | 6.4 | 6.3 | 4.6 |
| 2.5 | 1.9 | 5.1 | 5.3 | 4.5 |
| 3.5 | 1.8 | 4.5 | — | 4.2 |
| 4.5 | 1.5 | 4.0 | 3.9 | 3.8 |
| 5.5 | 1.2 | 3.9 | 2.4 | 3.5 |
| 6.5 | 0.9 | 3.2 | 2.0 | 3.2 |
| 7.5 | 0.8 | 2.4 | 2.2 | 2.9 |

[A] 4000 ppm commercial Rosemary Extract HERBOR and 400 ppm citric acid
[B] 200 ppm commercial tertiary butylhydroquinone (TBHQ)
[C] 4000 ppm of the antioxidant materials described in Example 4 (invention)

The results demonstrate that after a 7.5 hour exposure to 180° C., the antioxidant materials isolated from SG coffee oil (Example 4) exhibit roughly the same effect as the commercial Rosemary extract.

EXAMPLE 12

The kitchen fryer (Example 10) was filled up with 2.5 liters commercial palm oil the temperature of which was brought to 130° C. A series of 100 g frozen samples of extruded noodles were immersed separately into the oil for exactly 70 seconds and then stored in sealed plastic bags at 15° C. Three additional series of noodles were fried in palm oil containing antioxidants as documented in Table V.

After 8-month storage at 15° C. the noodles were boiled for 3 min in water and evaluated for their organoletical properties by a tasting panel involving a five-member board of degustators. The results are presented in the following Table V:

TABLE V

Organoleptic Status of Noodles Fried in Palm Oil at 130° C.

| Added Antioxidants | Time 0 | After 8 months at 15° C. |
| --- | --- | --- |
| None | Neutral | Rancid off-flavor The noodles taste "old" |
| A | Neutral | Taste and off-favor of a phenolic nature |

TABLE V-continued

Organoleptic Status of Noodles Fried in Palm Oil at 130° C.

| Added Antioxidants | Time 0 | After 8 months at 15° C. |
| --- | --- | --- |
| B | Slight Rosemary flavor | Slightly rancid off-flavor. Rosemary aftertaste |
| C | Slightly bitter after-taste | Slightly bitter after taste. No signs of rancidity |

[A] 200 ppm TBHQ
[B] 4000 ppm commercial Rosemary extract
[C] 4000 ppm of the antioxidant materials of Example 4 (invention)

The results in above Table V show that the antioxidant materials exhibit a carry-through-effect that is comparable to that of other antioxidants. It means that the antioxidants protect the frying oil instored in noodles against rancidity over a prolonged period of time. The slightly bitter aftertaste disappears once the noodles are seasoned.

It results from the preceeding description and Examples that the antioxidant materials forming the composition according to the present invention are presenting various advantages, which can be summarized as follows:

— They are isolated from spent coffee grounds which represent an industrial waste resulting from the production of instant coffee.

— They contain measurable amounts (10–40%) of known antioxidants such as the 5-hydroxytryptamide species which act synergistically with other lipids and antioxidants present in the matrix, whereby the combined antioxidant effect is increased severalfold. The reduced antioxidant activity of pure 5-HT species in comparison results probably from their tendency for self-association in apolar mediums such as vegetable oils or aliphatic hydrocarbons.

— They are lipophilic and melt at temperatures higher than 60° C., which means that they dissolve in food-grade fats and oils under moderate conditions. Moreover, the functionality of hydrophilic antioxidants of the invention is promoted by the presence of complex lipids which are naturally instored in the matrix and act as emulsifiers.

— Certain synthetic flavor concentrates as well as natural flavor condensates (e.g. those from roasted coffee) are soluble in the antioxidant materials of the invention or in a foodgrade oil enriched with them. In either case, they solidified or dissolved in the oil, protect the flavor and its carrier medium from a premature degradation and, at the same time, they mediate a slow release of the flavor over extended periods of time.

— When instored in a convenient filter aid, they form a dry powder which can absorb oily flavor condensates or concentrates. The powder can be used as an exogenous flavor carrier.

— They represent a natural matrix which is exempt of any chemical agents, and can thus be used in instant coffee as a natural and functional constituent.

— They exhibit antioxidant properties in foodgrade oils, which are used at elevated frying temperatures, whereas the oil absorbed by the fried products is protected against rancidity by them.

— They can further advantageously be used for aroma protection or stabilization.

— They are identifiable in food products and flavor carriers by analyzing the fatty acid composition of the moieties bound to the 5-hydroxytryptamide species which are naturally present in SG coffee oils and differ from those in coffee waxes and other fractions derived from green and roasted coffee beans.

We claim:

1. A process for producing an antioxidant composition, comprising the steps of recovering a gelatinous retentate from spent ground coffee oil, and de-oiling and drying said gelatinous retentate to produce said composition in solid form and comprising from 20 to 60% by weight complex lipids and from 10 to 75% by weight 5-hydroxytryptamide carboxylic acids.

2. The process according to claim 1, wherein said recovering step is carried out by filtration at room temperature and under a vacuum in the range of 50 to 300 millibar.

3. The process according to claim 2, wherein said vacuum is about 100 millibar.

4. The process according to claim 1, wherein said recovering step is carried out by filtration at room temperature, with a filter aid and at a pressure in the range of 3 to 6 bars.

5. The process according to claim 4, wherein said pressure is about 4 bars.

6. The process according to claim 1, wherein said de-oiling and drying steps are carried out by suspending said retentate in an apolar aliphatic solvent, centrifuging the suspension, recovering the de-oiled solid, and eliminating the solvent at about 70° C. under vacuum so as to produce said composition as a dark-brown powder.

7. The process according to claim 6, wherein said apolar aliphatic solvent is hexane.

8. The process according to claim 1, wherein said de-oiling and drying steps are carried out by suspending said retentate with a filter aid in an apolar aliphatic solvent, agitating the suspension at about 80° C., filtering the mixture and concentrating to dryness the filtrate so as to produce said composition as a dark-brown powder.

9. The process according to claim 8, wherein said apolar aliphatic solvent is heptane.

10. The process according to claim 1, wherein said de-oiling step is effected using a supercritical $CO_2$ technique.

11. The process according to claim 1, wherein said gelatinous retentate is produced by suspending said spent ground coffee oil in hexane and ultrafiltering said suspension on a membrane at 25°–40° C. and under pressure of about 2 to about 10 bars, and said de-oiling and drying steps are performed by eluting the retentate from the membrane using a polar organic solvent and evaporating the solvent to recover said composition as a dark-brown solid residue.

12. The process according to claim 11, wherein said polar organic solvent is chloroform-methanol.

* * * * *